United States Patent [19]

Sauter et al.

[11] Patent Number: 4,989,303
[45] Date of Patent: Feb. 5, 1991

[54] TOOL TURRET

[75] Inventors: Willy Sauter, Reutlingen; Helmut Thumm, Metzingen; Günther Schips, Metzingen; Alfred E. Müller, Metzingen, all of Fed. Rep. of Germany

[73] Assignee: Sauter Feinmechanik GmbH, Fed. Rep. of Germany

[21] Appl. No.: 357,518

[22] Filed: May 26, 1989

[30] Foreign Application Priority Data

May 26, 1988 [DE] Fed. Rep. of Germany ....... 3817893

[51] Int. Cl.⁵ .................. B23B 29/32; B23Q 17/00
[52] U.S. Cl. ...................... 29/48.5 A; 74/813 L; 74/826; 82/159
[58] Field of Search .............. 29/33 P, 48.5 A, 49; 74/813 L, 823, 826; 269/57; 409/221; 188/68, 74; 82/129, 159

[56] References Cited

U.S. PATENT DOCUMENTS

| | | | |
|---|---|---|---|
| 3,618,426 | 11/1971 | Fisher | 74/826 X |
| 3,718,055 | 2/1973 | Maier | 74/813 L X |
| 4,015,487 | 4/1977 | Pfiester | 74/813 L |
| 4,468,991 | 9/1984 | Reusch et al. | 82/159 |

FOREIGN PATENT DOCUMENTS 3153112 3/1983 Fed. Rep. of Germany.

OTHER PUBLICATIONS

G. Niemann, Maschine-elemente, 1981 p. 394.

Primary Examiner—Z. R. Bilinsky
Attorney, Agent, or Firm—Roylance, abrams, Berdo & Goodman

[57] ABSTRACT

A tool turret has a locking mechanism part axially slidable relative to the turret head with a face gear engaging face gears of the turret head and the housing in its locked position. The axial slidability of the locking mechanism part out of its locked position and the curtailibility of an opposing compression spring allows disengagement of the face gear of the locking mechanism part from at least one of the other two face gears. The force of the compression spring during the load on the turret head arising in disturbance-free operation is greater than the force working through this load on the locking mechanism part in the direction of disengagement of its face gear. In case of a collision with a stress exceeding the load capacity of the tool turret, the force of the compression spring is smaller than the collision force working through this load on the locking mechanism part in the direction of a disengagement of its face gear.

5 Claims, 2 Drawing Sheets

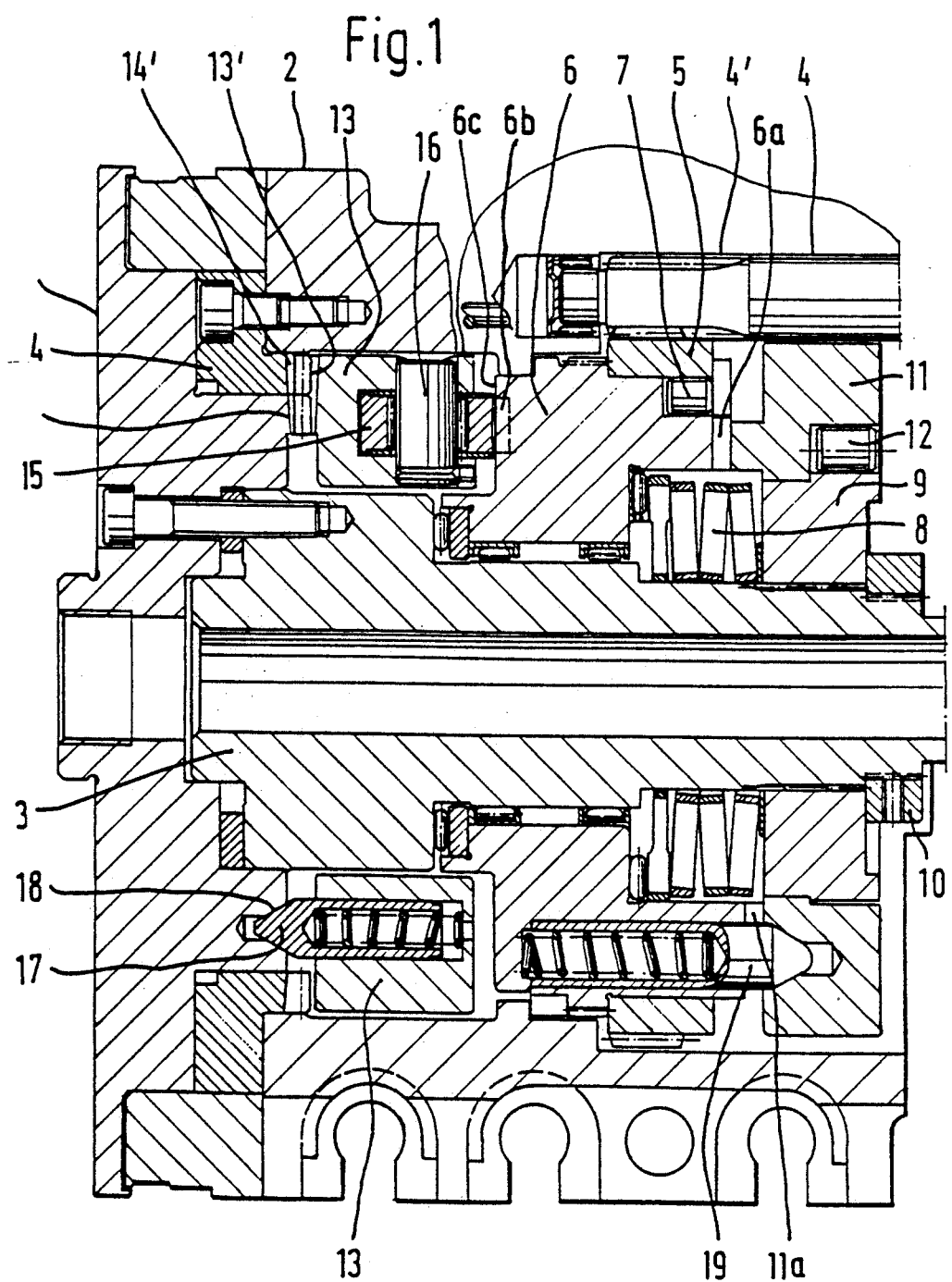

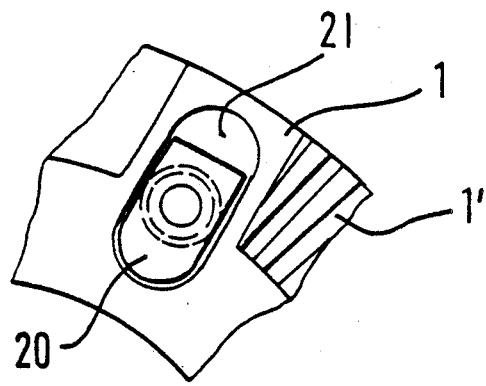
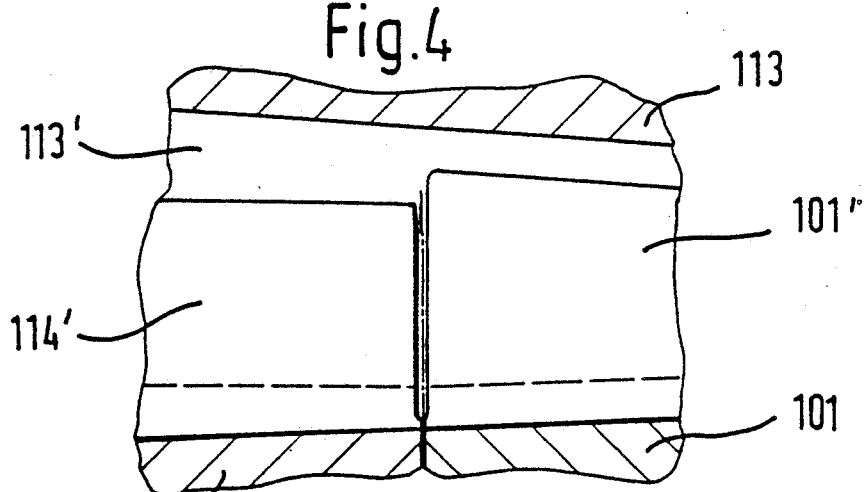
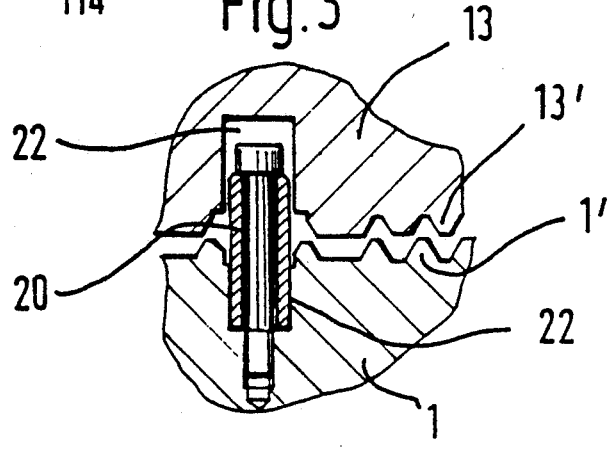

TOOL TURRET

CROSS REFERENCE TO RELATED APPLICATIONS

The subject matter of this application is related to U.S. patent application Ser. No. 07/358,005 of Willy Sauter, Helmut Thumm and Erhart Obmann entitled Tool Turret with Rapidly Angularly Adjustable Turret Head, and to U.S. patent application Ser. No. 07/358,004 of Helmut Thumm, Walter Reusch, Gunther Schips and Willy Sauter entitled Tool Turret with Flexible Clutch, both filed concurrently herewith. The subject matters of both related applications are hereby incorporated herein by reference.

FIELD OF THE INVENTION

The present invention relates to a tool turret including a turret head coupled to a housing and rotatable relative to the housing by a motor about a rotational axis, and face gears arranged coaxial to the rotational axis and nonrotatably coupled respectively to the turret head and the housing. A locking part is axially slidable relative to the turret head between locked and unlocked positions, and has a face gear engaging the turret head and housing face gears in the locked position. A compression spring biases the locking part into its locked position with the locking part face gear engaging the other face gears. A control member is coupled to and controls positioning of the locking part.

BACKGROUND OF THE INVENTION

With the known tool turret of this type, the compression spring, which presses the locking mechanism part into its locked position against the gear faces of the turret head and the housing, is of such dimensions that in no case can a load or charge applied to the turret head cause disengagement of the parts or release of its locked setting. Release of the locking mechanism is possible only when the control member is brought into a release setting. If a collision or impact occurs to the known tool turret exerting a high torque force on the turret head, damage to or destruction of parts of the tool turret will almost always result.

Such damages result in costly repairs and production downtime.

SUMMARY OF THE INVENTION

An object of the present invention is to provide a tool turret which avoids damage in case of collision.

The foregoing object is obtainable by a tool turret comprising a housing and a turret head coupled to the housing and rotatable relative to the housing by a motor about a rotational axis. First and second face gears are arranged coaxial to the rotational axis. The first face gears is nonrotatably coupled to the turret head. The second face gear is nonrotatably coupled to the housing. The face gears have flanks lying beyond and automatic locking rage. A locking part is axially slidable relative to the turret head between locked and unlocked positions, and has a third face gear engaging the first and second face gears in the locked position. A compression spring means biases the locking part into the locked position with the third face gear engaging the first and second face gears. The axial sliding movement of the locking part to its unlocked position and the compressibility of the compression spring means permits the third face gear to disengage from at least one of the first and second face gears in its unlocked position. The compression spring means also exerts a force on the locking part greater than forces exerted thereon in the direction of the unlocked position by the turret head during collision free operation, but smaller than forces exerted thereon in the direction of the unlocked position by the turret head upon a collision exerting a stress upon the tool turret exceeding a predetermined limit. A control member is coupled to and controls positioning of the locking part.

When a top limit of the allowable torque exerted on the turret head is exceeded by a sufficiently great degree over both the loads occurring during disturbance-free operation and also those values calculated to cause damage or destruction of parts of the tool turret in case of a collision, the locking mechanism of the turret head may be forcibly released and the turret head may be rotated relative to the housing. Damage to parts of the turret head then does not occur. Following such collision, the turret head then need only be rotated back again into its original position.

If the turret head is rotated relative to the locking part during a collision, a partial disassembly would be required in order to rotate it back again into the original position relative to the locking part. In one preferred exemplary embodiment, a torque cut-out mechanism is provided. The torque cut-out mechanism allows for the reverse movement of the locking part, but connects the turret head and the locking part permanently nonrotatably with each other. Rotation of the turret head as a result of a collision then leads only to a joint rotation of the turret head and the locking part together. The turret head can then be rotated back with the aid of the drive motor and the signals produced from the angle setting transmitter into that angle setting in which it was located before the collision. In this manner the production interruption caused by a collision can be held to a minimum.

Such torque cutout mechanism for instance can have at least one carrier element extending parallel to the rotational axis and engaging the turret head and the locking part. In one preferred embodiment, each carrier element is a slide ring mounted securely on the turret head and guided slidably in a guide channel in the locking part in the slide direction of the locking part. Thus, it is guaranteed that rotation of the turret head relative to the locking part is then still impossible when the face gears of the two parts are not engaged with each other. Of course, it would also be possible to provide slide rings or carrier elements of some other configuration to be mounted on the locking part and to engage guide channels in the turret head.

In one particularly advantageous configuration of the torque-cutout mechanism, the height of the gear teeth of the face gear of the turret head is greater than the height of the gear teeth of the face gear of the housing. When the locking part is disengaged as a result of a collision, the gear teeth of the locking part come out of engagement with the gear teeth of the face gear of the housing only. Thus, rotation of the turret head is permitted without the gear teeth of its face gear coming out of engagement with the gear teeth of the locking part. It is also guaranteed that in case of a collision no rotation of the turret head can occur relative to the locking part.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 1 is a partial side elevational view in section of a tool turret according to a first embodiment of the present invention;

FIG. 2 is a partial plan view of the surface of the turret head facing the locking mechanism part of FIG. 1;

FIG. 3 is a partial side elevational view in section of the carrier element of FIG. 2; and FIG. 4 is an enlarged side elevational view in section of a tool turret according to a second embodiment of the present invention.

DETAILED DESCRIPTION OF THE INVENTION

A tool turret has a turret head 1 which projects out of one end of a housing 2. The turret head is rotatable relative to the housing into various, precisely defined angle settings. A plurality of tool holders may be fastened in a known manner to turret head 1.

Housing 2 may be securely fastened to a machine tool. The housing is closed off and sealed at the end opposite turret head 1 by a partition wall (not shown). One end of a hollow drive shaft 3 is rotatably mounted in the partition wall concentric to the rotary axis of turret head 1. The other end of shaft 3 is screwed tightly to turret head 1. A covering bonnet (not shown) engages the side of the partition wall away from housing 2. The partition wall tightly seals off a chamber housing all of the electric structural components of the tool turret including an asynchronous motor. The motor shaft extends parallel to the drive shaft 3, and passes through the partition wall in which it is rotatably mounted. A protruding end of the motor shaft extends into the inside chamber of housing 2 and is connected with a reduction gearing, of which only the drive shaft 4 with its pinion 4' is shown.

Pinion 4' mates with outside gear teeth of a ring 5. Ring 5 is mounted rotatably on a control member 6 which in turn is mounted rotatably and axially slidably on drive shaft 3. Control member 6 and ring 5 are provided with radially extending gear teeth which mate with each other. Between the gear teeth of ring 5 and control member 6, rubber-elastic cylindrical attenuators 7 are arranged, which attenuators are shown in the exemplary embodiment without any play. Ring 5, control member 6 and attenuators 7 thus form an elastically shock-absorbing assembly.

As shown in FIG. 1, control member 6 is supported on its working side turned away from turret head 1, through a bearing, on a set of cup springs 8. The cup springs 8 surround drive shaft 3 and are supported on an annular inner part 9 of a second elastically shock-absorbing assembly. This inner part 9 is longitudinally slidable by a gear assembly, but is nonrotatable in its arrangement on drive shaft 3, and is supported on a support ring 10 connected securely with drive shaft 3.

Inner part 9 of the second shock-absorbing, assembly is surrounded by an outside part 11. Outside part 11 has inside gear teeth which engage between gear teeth on inner part 9. Between these gear teeth are arranged cylindrical, elastic, shock-absorbing members 12, shown without any play in the exemplary embodiment.

Between control member 6 and the reduced diameter end segment of turret head projecting into housing 2, an annular locking mechanism part 13 is arranged. Part 13 is rotatably and axially slidably mounted on drive shaft 3. The side of part 13 toward turret head 1 is provided with gearing 13' having radially extending gear teeth. A gear assembly 1' of corresponding configuration is provided on the working surface of a face of turret head 1 turned toward locking mechanism part 13. A gear assembly 14' configured identical to gear assembly 1' is constructed on the working surface of a face turned toward locking mechanism part 13. Face gear 14 is connected securely with housing 2. Both gear assemblies 1' and 14' are cut and ground together, since they serve together with gear assembly 13' of locking mechanism part 13 to position turret head 1 with great precision in the desired angle setting. The set of cup springs 8 produces the force with which its gearing 13' is pressed into gear assemblies 1' and 14' when locking mechanism part 13 is in its locked position.

Rolls 15 are provided for controlling the axial thrust of locking mechanism 13. The rolls are mounted rotatably on radially extending journals 16 arranged and distributed uniformly around the periphery of locking mechanism part 13 inside locking mechanism part 13. Rolls 15 project over the working surface of locking mechanism part 13 turned toward control member 6 for the same distance.

Blind-end bores are provided in locking mechanism part 13 in the intermediate spaces between journals 16 and opening on the working side of part 13 turned toward turret head 1. A carrier bolt 17 is mounted to be longitudinally slidable in each blind-end bore and is loaded by means of a prebiased spring. The end segment of this carrier bolt 17 projecting from locking mechanism part 13 is configured to be conical. The cone angle of the conical end segment lies outside the automatic locking range. Each carrier bolt 17 is fitted in a conical bore 18 extending into turret head 1. The cone angle of bore 18 is adapted to that of the carrier bolt end. These conical bores 18 each lie in a depression from which carrier, bolt 17 cannot emerge, whereby the rotation angel of turret head 1 relative to locking mechanism part 12 is limited.

Control member 6 has a curve sector or cam race on its working side turned toward locking mechanism part 13. The curve sector extends around the entire periphery and serves as roll path for rolls 15. This curve sector has flat segments 6c and hollowed-out segments 6b in a radial plane. The hollowed out segments have a curvature adapted to the curvature of the outside surface of rolls 15. If rolls 15 lie each on one of the flat segments, then locking mechanism part 13 is located in its locked position in which gearing 13' is normally completely in engagement with gear assemblies 1' and 14' without any play. If rolls 15 engage completely in the hollowed-out segments of the curve sector, then locking mechanism part 13 is in its release setting or unlocked position, in which its gear assembly 13' completely releases gear assemblies 1' and 14'.

Control member 6 has axially protruding pawls 6a on its working side aligned with the outside part 11. Such pawls engage each in a groove 11a of outside part 11. Both the pawls and the grooves have flanks (sides) arranged in radial planes so that a form-locking coupling is formed when the pawls engage on one or the other flank of the associated groove. The breadth of the grooves measured periphally is greater than the corresponding breadth of the pawls. The relative breadths is such, starting from an orientation of the pawls in the middle of the associated groove, which corresponds to a position of rolls 15 in the middle of one of the flat segments, each pawl can be moved relative to the groove in one direction or the other direction for a distance sufficient for rolls 15 to come into complete engagement each with one of hollowed-out segments of the curve sector. In this position, the pawl lies on one flank of the groove.

A plurality of centering bolts 19 is provided as a substitute for a mechanical brake or a special stop mechanism. The bolts are mounted to slide longitudinally in bores parallel to drive shaft 3 and extending from the working surface of each pawl into control member 6. A spring biases each centering bolt 19 holding it against outside part 11. The end segment of center bolt 19 extending over the pawl is conical. The cone angle is outside the automatic locking range. A conical bore is provided in the middle of each of the grooves. The cone angle of each conical bore is adapted to the cone angle of the associated centering bolt 19, which engages the conical bore when the pawl is aligned in the middle of the groove. Centering bolts 19 not only replace a stop member or an electromagnetic brake. Also, during relative movement between control member 6 and outside part 11, they prevent any excess movement over the middle position, since centering bolts 19 and conical bores 18 cooperate in operation by virtue of their conical shape.

The degree or distance to which cup spring unit 8 can be compressed in an axial direction is greater than the distance locking mechanism part 13 must move from its locked position against the force of cup spring unit 8 so that its gearing 13' comes out of engagement with gear assemblies 1' and 14'. Also, the spring characteristic line of cup spring unit 8 is selected so that indeed no torque exerted on turret head 1 during a disturbance-free operation can lead to the situation wherein, as a result of the inclination of the gear teeth flanks of gear assemblies 1' and 14' and gearing 13', gearing 13' is disengaged from gear assemblies 1' and 14'. Such a disengagement occurs when the torque on turret head 1 has attained a value at which if the value increases it could damage or destroy parts of the tool turret.

If, during such disengagement of gearing 13' from gear assemblies 1' and 14', turret head 1 could be rotated relative to locking mechanism part 13, then turret head 1 must be dismantled and brought back into the original position relative to locking mechanism part 13. A plurality of slide rings 20 are then distributed over the working surface of turret head 1 supporting gear assembly 1' to avoid such situation. The slide rings are arranged uniformly around the periphery and extend in axial directions. As shown in FIGS. 2 and 3, each slide ring is mounted in a depression 22 in turret head 1 by a bolt. The protruding part of each slide ring 20 engages in a depression 22 in the working surface of locking mechanism part 13 supporting gearing 13'. The depth of engagement of slide rings 20 in depressions 22 is greater than the depth of engagement of the gearing 13' in gear assemblies 1' and 14'. Therefore, the slide rings 20 remain in contact with locking mechanism part 13, even during a collision when part 13 is brought out of engagement with both of the gear assemblies 1' and 14'. Turret head 1 in such a case can, therefore, only be rotated relative to face gear 14, but not relative to locking mechanism part 13. In order to make the tool turret ready for operation again, then, following such a collision turret head 1 need only be rotated back into the original position with the aid of the drive motor. This is possible without further difficulty on the basis of the data coming from an angle position transmitter (not shown).

Sudden torque loads and impacts as occur in normal operation are absorbed by the two elastic couplings. Carrier bolts 17 and centering bolts 19 also exert a certain shock-absorbing effect.

The rotational movement is conveyed from the motor to o shaft 4 and to pinion 4'. Pinion 4' drives outside ring 5. The rotation of outside ring 5 is conveyed through attenuators 7 to control member 6, and then to outside part 11 by the engagement of pawls 6a and grooves 11a. Before turret head 1 can be indexed by the rotation of pinion 4', rolls 15 must be engaged in hollowed-out segments 6b of the curve sector or cam race on control member 6. The rotation of control member 6 brings the hollowed-out segments into alignment with the rolls such that locking mechanism part 13 is moved to its release setting disengaging gear assembly 13' from gear assemblies 1' and 14'. The rotation of outside part 11 by control member 6 is delayed until rolls 15 are engaged in the hollowed-out segments. The delayed rotation is provided by the peripheral breadth of pawls 6a on control member 6 being less than the peripheral breadth of grooves 11a in outside part 11, as described above. When the rolls and the hollowed-out segments are engaged, the pawls engage groove flanks permitting control member 6 to rotate outside part 11. From outside part 11 the rotation is conveyed through attenuators 12 to inner part 9. Inner part 9 drives shaft 3, and thereby, turret head 1.

The second exemplary embodiment differs from the first embodiment described above, only in the cutout mechanism to halt rotation of the turret head relative to the locking mechanism part in case of a collision. Disengagement of the locking mechanism part relative to the turret head does not employ slide rings and depressions holding these slide rings. As shown in FIG. 4, the height of the gear teeth of the gear assembly 101' on turret head 101 is greater than the height of the gear teeth of gear assembly 114' of the face gear 114 connected securely with the housing. When locking mechanism part 113 is in its locked position, its gearing 113', despite this height differential of gearing assemblies 101' and 114' is in engagement with both of these gearing assemblies without play.

If, as a result of a collision, locking mechanism part 113 is disengaged, contrary to the force of the cup spring unit, then gearing 113' remains in engagement with gear assembly 101'. Turret head 101 can be rotated as soon as gearing 113' has come out of engagement with gear assembly 114'. Following such a rotation as a result of a collision then, as in the first exemplary embodiment, locking mechanism part 113 need be brought into its locked position with the aid of the control member. Then turret head 101 needs to be rotated back into the original position by the drive motor and the data from the velocity control transmitter, because the position of turret head 101 relative to locking mechanism part 113 has not changed.

While various embodiments have been chosen to illustrate the invention, it will be understood by those skilled in the art that various changes and modifications can be made therein without departing from the scope of the invention as defined in the appended claims.

What is claimed is:

1. A tool turret, comprising:

a housing;

a turret head coupled to said housing and rotatable relative to said housing by a motor about a rotational axis;

first and second face gears arranged coaxial to said rotational axis, said first face gear being nonrotatably coupled to said turret head, said second face gear being nonrotatably coupled to said housing, said face gears having flanks lying beyond an automatic locking range;

a locking part axially slidable relative to said turret head between locked and unlocked positions, and having a third face gear engaging said first and second face gears in said locked position;

compression spring means for biasing said locking part into said locked position with said third face gear engaging said first and second face gears, axial sliding movement of said locking part to said unlocked position and compressibility of said compression spring means permitting said third face gear to disengage from at least one of said first and second face gears in said unlocked position, said compression spring means exerting a force on said locking part greater than forces exerted thereon in the direction of said unlocked position by said turret head during collision free operation, but smaller than forces exerted thereon in the direction of said unlocked position by said turret head upon a collision exerting a stress upon said tool turret exceeding a predetermined limit; and a control number coupled to and controlling positioning of said locking part.

2. A tool turret according to claim 1 wherein torque cut-out means connects said locking part nonrotatably with said first face gear in said unlocked position, while permitting said third face gear to disengage said second face gear in said unlocked positioned.

3. A tool turret according to claim 2 wherein said torque cut-out means comprises at least one carrier element extending parallel to said rotational axis and engaging said turret head and said locking part.

4. A tool turret according to claim 3 wherein said carrier element comprises a slide ring securely mounted on said turret head and slidably received in a channel extending into said locking part parallel to said rotational axis.

5. A tool turret according to claim 2 wherein said torque cut-out means comprises teeth of said first and second face gears, said teeth of said first face gear having a height in a direction parallel to said rotational axis greater than that of said teeth of said second face gear.

* * * * *

UNITED STATES PATENT AND TRADEMARK OFFICE
CERTIFICATE OF CORRECTION

PATENT NO. : 4,989,303

DATED : February 5, 1991

INVENTOR(S) : Willy SAUTER et al.

It is certified that error appears in the above-identified patent and that said Letters Patent is hereby corrected as shown below:

In claim 1, penultimate line, appearing in column 8 line 6, "number" should read -- member --.

Signed and Sealed this

Fourth Day of August, 1992

Attest:

DOUGLAS B. COMER

Attesting Officer

Acting Commissioner of Patents and Trademarks